(12) United States Patent
Steinberg et al.

(10) Patent No.: US 8,711,154 B2
(45) Date of Patent: Apr. 29, 2014

(54) SYSTEM AND METHOD FOR PARALLEL VIDEO PROCESSING IN MULTICORE DEVICES

(75) Inventors: Erez Steinberg, Tel-Aviv (IL); Yaniv Klein, Netanya (IL); Yehuda Yitschak, Ramat Yishai (IL); Srirama Rao Garikipati, New Delhi (IN); Rajeev Tiwari, Madhaya Pradesh (IN); Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 909 days.

(21) Appl. No.: 12/135,638

(22) Filed: Jun. 9, 2008

(65) Prior Publication Data

US 2009/0307464 A1 Dec. 10, 2009

(51) Int. Cl.
*G06F 15/16* (2006.01)
*G06F 9/46* (2006.01)
*H04B 1/66* (2006.01)

(52) U.S. Cl.
USPC ...... 345/504; 345/502; 718/105; 375/240.01; 375/240.24

(58) Field of Classification Search
None
See application file for complete search history.

(56) References Cited

U.S. PATENT DOCUMENTS

| | | | |
|---|---|---|---|
| 6,748,019 B1 | 6/2004 | Lin et al. | |
| 2004/0135885 A1* | 7/2004 | Hage | 348/143 |
| 2005/0053131 A1* | 3/2005 | Domke et al. | 375/240.01 |
| 2006/0126728 A1 | 6/2006 | Yu et al. | |
| 2006/0221086 A1* | 10/2006 | Diard | 345/505 |
| 2007/0086528 A1* | 4/2007 | Mauchly et al. | 375/240.24 |
| 2007/0180485 A1* | 8/2007 | Dua | 725/114 |
| 2007/0189377 A1* | 8/2007 | Taylor et al. | 375/240 |
| 2007/0253491 A1 | 11/2007 | Ito et al. | |
| 2008/0046588 A1* | 2/2008 | Deshpande et al. | 709/236 |
| 2008/0137736 A1* | 6/2008 | Richardson et al. | 375/240.03 |
| 2010/0122044 A1* | 5/2010 | Ford et al. | 711/154 |

FOREIGN PATENT DOCUMENTS

EP 1850598 A1 * 10/2007

OTHER PUBLICATIONS

Ribeiro, M. et al., "MPEG-4 Natural Video Parallel Implementation on a Cluster", RECPAD 2002—12th Edition of the Portuguese Conference on Pattern Recognition, APRP—The Portuguese Association for Pattern Recognition.*

T. Fujii et al., A Load Balancing Technique for Video Signal Processing on a Multicomputer Type DSP, International Conference on Acoustics, Speech, and Signal Processing, Apr. 11-14, 1988.

K.H. Goh et al., Real Time Full-Duplex H.263 Video Code System, IEEE First Workshop on Multimedia Signal Processing, Jun. 23-25, 1997.

B. Jung et al., Adaptive Slice-Level Parallelism for Real-Time H.264/AVC Encoder with Fast Inter Mode Selection, http://media.skku.ac.kr/publications/paper/IntC/jbs_oe2007.pdf, 2007.

* cited by examiner

*Primary Examiner* — Maurice L. McDowell, Jr.
*Assistant Examiner* — Donna J Ricks
(74) *Attorney, Agent, or Firm* — Terrile, Cannatti, Chambers & Holland, LLP; Michael Rocco Cannatti

(57) ABSTRACT

Embodiments are disclosed for a system and method for parallel processing of video signals. A multi-core processor is used to establish a master-slave relationship between a first processing core and a plurality of individual processing cores. Shared memory is used to store data and control messages. A plurality of individual private memories are associated with each of the individual processing cores; and control logic is used to establish a master-slave protocol for using the plurality of individual cores to process video data. The master processing core is operable to balance the video data processing load among the individual slave processing cores.

18 Claims, 5 Drawing Sheets

SYSTEM AND METHOD FOR PARALLEL VIDEO PROCESSING IN MULTICORE DEVICES

BACKGROUND OF THE INVENTION

1. Field of the Invention

The present invention relates in general to scalable video processing and, more specifically, to a system and method for efficient parallel processing of video data.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or to enable improved video quality at a given transmission rate. The processing of video signals in accordance with the H.264 standard, or other standards, requires a very large amount of computational resources. For example, to encode a H.264 high-definition (HD) data stream for 720p@30 fps video in real-time, it is usually necessary to use a multi-core processor having clock speeds greater than 1 GHz. One of the most challenging aspects of digital signal processing relates to scenarios for dispatching tasks among multiple digital signal (DSP) processing cores. There is a need, therefore, for a system and method for balancing the processing load among multiple processing cores in a multi-core device.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Embodiments of systems and methods are described herein for providing load balancing among multiple processing cores to perform parallel processing of video data streams. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified drawings in order to avoid limiting or obscuring the present invention. Such descriptions and representations are used by those skilled in the art to describe and convey the substance of their work to others skilled in the art. Various illustrative embodiments of the present invention will now be described in detail with reference to the figures.

Figure 1:
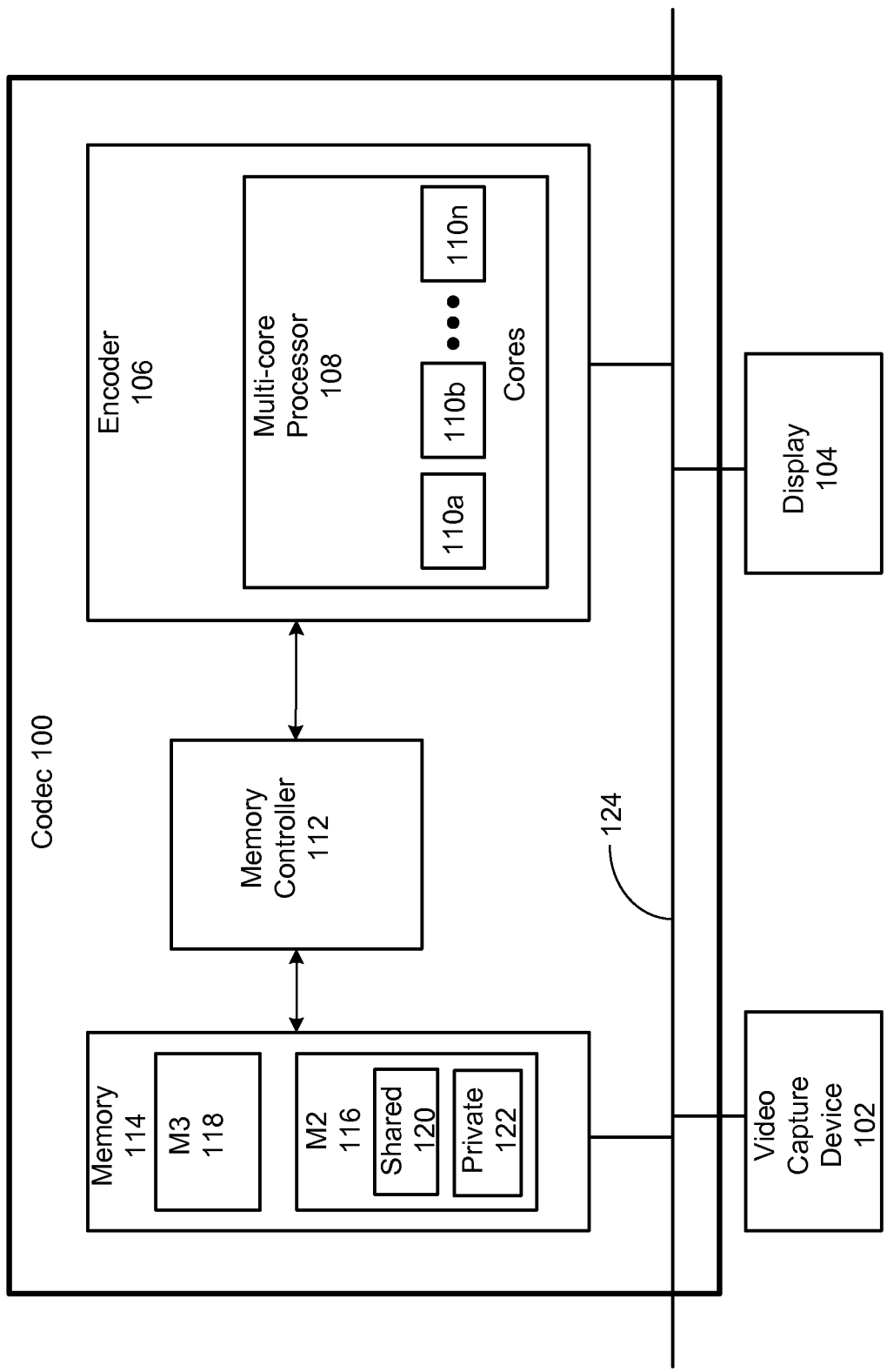
FIG. 1 is an illustration of a codec comprising a multi-core processor for processing video signals.

FIG. 1 is an illustration of a codec 100 that is operable to receive a video data stream from a video capture device 102 and to process the video data for use by a display 104. Although the embodiment illustrated in FIG. 1 shows data being captured by a video capture device, those of skill in the art will understand that there are numerous other ways of providing video data to a multi-core processor. For example, in infrastructure applications, the video is received compressed over a network, and is decoded and re-encoded in the system. In this case, video may arrive on various interfaces (PCI, SRIO, etc.). An encoder 106 comprises a multi-core processor 108 that further comprises a plurality of data processing cores 110a, 110b, . . . , 110n (hereinafter sometimes referred to as "cores"). A memory controller 112 is operable to process memory requests to access memory 114, which includes M2 memory 116 and M3 memory 118. As will be discussed in greater detail hereinbelow, the various cores 110a, 110b, . . . , 110n may be configured in a master-slave relationship wherein the "master" processing core may have access to shared M2 memory 120 and private M2 memory 122. The "slave" cores may have access to shared memory, their respective private M2 memory, and to their message queue (which is shared with the master core). The codec 100 may be coupled to a variety of other components via a system bus 124.

When the video processing system is initiated, control software is executed by the multi-core processor 108 to establish the master-slave relationship between the various cores 110a, 102b, . . . , 102n, using techniques known to those of skill in the art. The master core is provided with information regarding the number of slave cores and is provided with handles to message queues.

Figure 2:
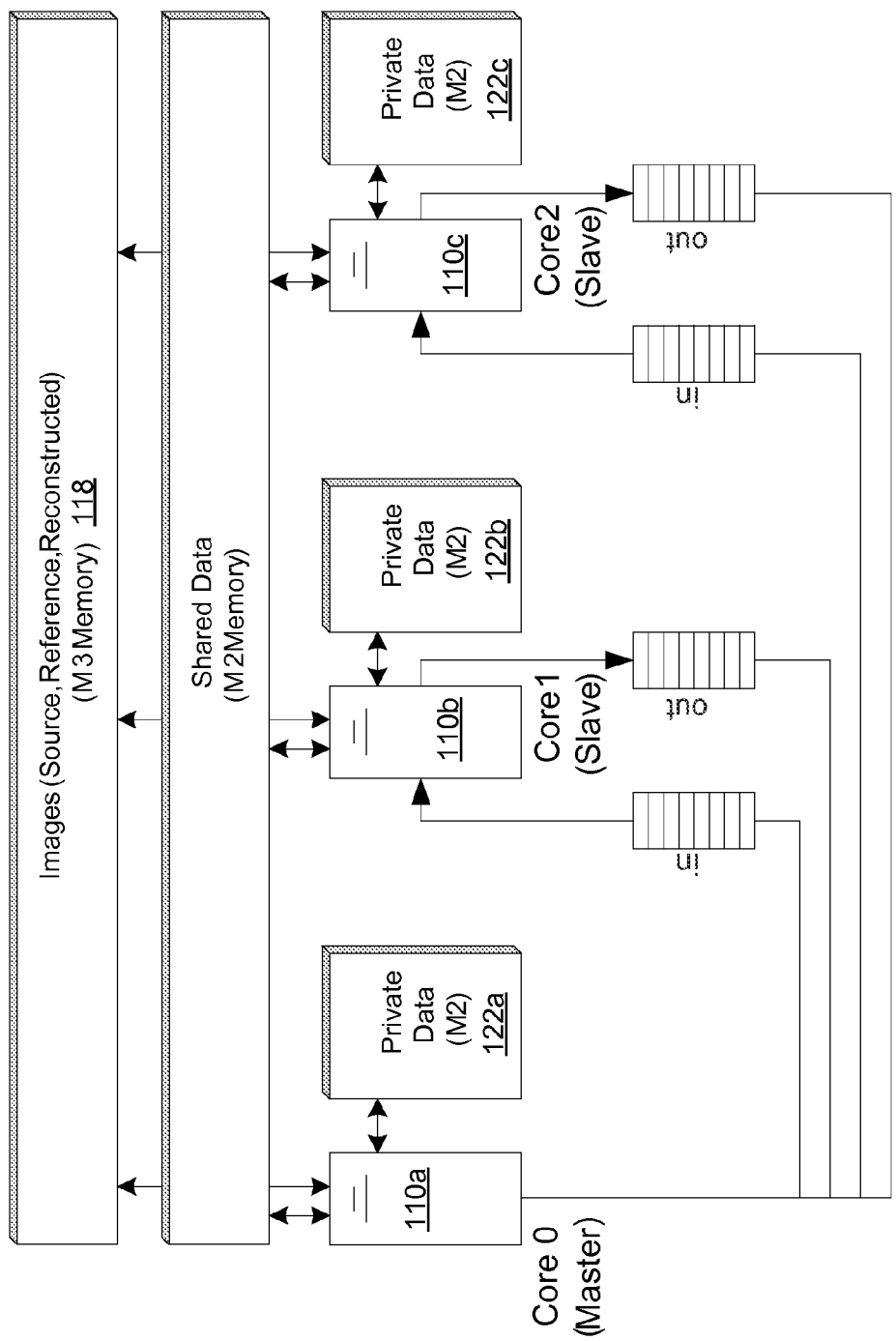
FIG. 2 is an illustration of a plurality of processing cores configured in a master-slave relationship.

FIG. 2 is an illustration of a plurality of processing cores configured in a master-slave relationship in accordance with embodiments of the invention. For purposes of discussion, core 110a is designated as the master, and cores 110b and 110c are designated as slave cores. The master core 110a is allocated its private memory 122a and all shared memory. The slave cores 110b and 110c are allocated their respective private memories 122b and 122c.

Most current implementations of H.264 encode images in macroblock scan order, i.e., from left to right, and from top to bottom. After all macroblocks have been encoded, the encoder will perform the loop filter on the entire frame. In general, the encoder encodes the entire frame into one slice. In embodiments of the invention, however, the encoder is instructed to generate multiple slices by limiting the number of bits per slice or the number of macroblocks per slice. To run efficiently, the codec strives to access as much data as possible in M2 memory. Large data that is located in M3 and DDR is DMAed to M2. Since the encoder controls the DMA via the DMA API, the multicore implementation allocates a DMA channel for each core. In embodiments where DMA is used, the codec maintains cache coherency using software cache commands.

The partitioning of a frame into slices is done in a manner to generate as few slices as possible to maintain high quality. In the various embodiments of the invention, all decisions are made only by the master core. Other slave cores receive requests from the master core and carry them out. Slaves cores periodically report their status to the master core, as discussed in greater detail hereinbelow. To partition a frame into slices, the master core sends a message to each slave core with the address of the first macroblock in the slice that the respective cores are asked to encode. The master core is also operable to send a message with the address of the last macroblock to be encoded in that slice; however, this message can be sent later based on regular progress sent by the slave cores. Data partitioning is the method of partitioning or processing data blocks in parallel. Source, reconstructed and reference image data is placed in shared memory. In various embodiments of the invention, communication between the cores is implemented using half-duplex channels. Each slave core has two channels: an ingress port and an egress port. The ports may be implemented using a simple FIFO structure shared in M2 memory. All accesses to the ports are non-cacheable. Therefore, the communication messages are generally short (64 bits).

To minimize the impact on data quality, the slice size is determined dynamically by the master core. The master core monitors the process in progress of the slave cores and sends a message to the relevant slave core with a slice size. Embodiments of the invention, are therefore, operable to provide slice-based load balancing of data processing between the respective processing cores on an intra-frame basis, rather than between multiple frames.

The master core 110a is operable to dispatch two types of tasks, encoding and deblocking, to slaves (and to itself). The encoding task is to start encoding at a given starting macroblock address (MBAddr). The master does not have to provide an "end MBAddr" when the encoding task starts. If an end MBAddr is provided, the slave will start a new slice at MBAddr and encode until end MBaddr. If 'end MBAddr' was not provided by the master, the slave continues until it finishes the frame or receives an end MBAddr by the master. An advantage of postponing the selection of an 'end MBAddr' is better load balancing. In an alternate embodiment, even after sending the endMBAddr, the master may decide to update the endMBAddr with a new value. This may be done if one of the cores is 'slow' and has a large portion of a slice remaining while the other cores are idle. In this case, the master will update the endMBaddr with a new value and dispatch a new 'encoding task' to the idle slaves. This further enhances the load balancing.

The deblocking task is a task to deblock from startMBAddr1 to endMBAddr2. The master core 110a keeps track of which MBs have been encoded and are ready for deblocking. If there are enough MBs to be deblocked, it will start the 'deblocking task.' This allows deblocking to be done as soon as possible. This is very important for load balancing. Slaves send periodic notification on their progress, i.e., which MBs they have finished encoding. The master 110a uses this information in determining what subsequent task to send to slave cores.

The load balancing does not have to be equal. For example, in an embodiment of the invention comprising three slave cores, two of the cores may 100% utilized, while the remaining core may be used only 50%. The system and method provided by embodiments of the invention is very flexible because all the required data is shared between slaves, i.e. reference frame, deblocking parameters, etc.

Figure 3:
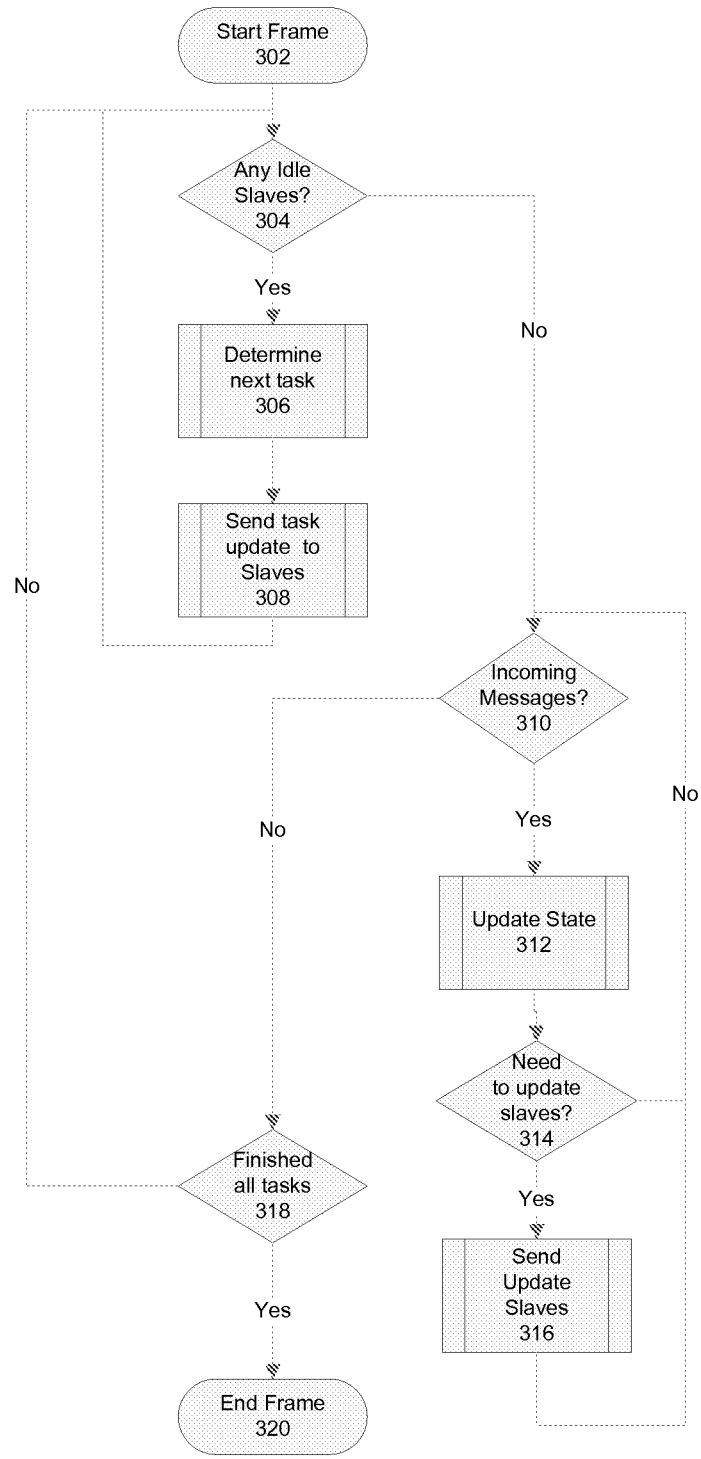
FIG. 3 is a flowchart illustration of a process flow for processing video data in accordance with embodiments of the invention.

FIG. 3 is a flowchart illustration of a process flow for processing video data in accordance with embodiments of the invention. In step 302, processing of a frame is initiated. In step 304, the master core 110a conducts a test to determine whether there are any idle slave cores. If the result of the test performed in step 304 indicates that there are idle slave cores, processing proceeds to step 306 wherein the master core 110a determines the next task for an idle slave core. In step 308, the master sends a message to the respective idle slave core indicating the task that is to be performed by that slave core.

If, however, the result of the test conducted in step 304 indicates that no slaves are idle, processing proceeds so step 310, wherein a test is conducted to determine whether any messages have been received. If the result of the test conducted in step 310 indicates that there are incoming messages, processing proceeds to step 312 wherein the processing states of the slaves is updated. If, however, the result of the test conducted in step 310 indicates that no messages were received, processing proceeds to step 314, wherein a test is conducted to determine whether there is a need to update the slaves.

If the result of the test conducted in step 314 indicates that the slaves do need to be updated, processing proceeds to step 316, wherein the update is sent to the slaves and processing again returns to step 310; if, however, the result of the test in step 314 indicates that the slaves do not need to be updated, processing returns immediately to step 310. If the test in step 310 indicates that there are no incoming messages, processing proceeds to step 318 wherein a test is conducted to determine whether all tasks have been completed. If the result of the test in step 318 indicates that all processing tasks have not been completed, processing returns to step 304 and the steps discussed above are repeated. If, however the test in step 318 indicates that all processing steps have been completed, processing proceeds to step 320 wherein the end of frame processing is ended.

Figure 4:
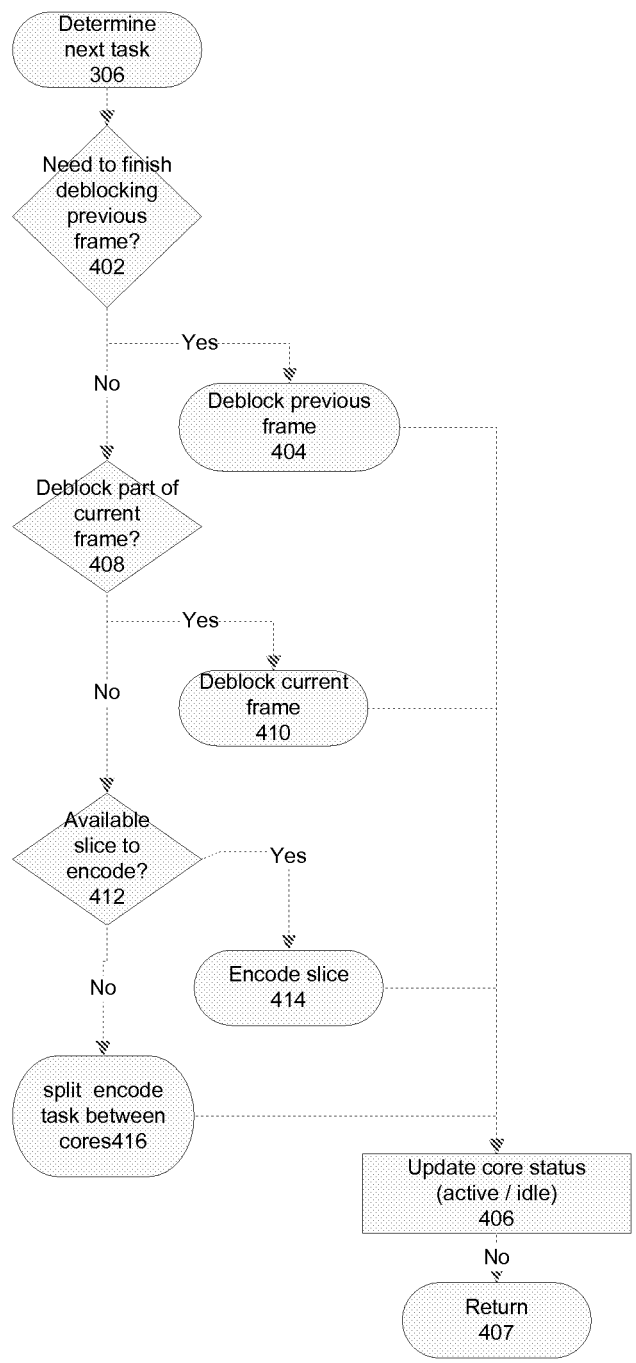
FIG. 4 is a flowchart illustration of a process flow for determining sequential processing tasks in accordance with embodiments of the invention.

FIG. 4 is a flowchart of the processing steps for determining the next task to be processed as indicated in step 306 of FIG. 3. In step 402, a test is conducted to determine whether there is additional processing needed to finish deblocking a previous frame. If the result of the test conducted in step 402 indicates that it is necessary to finish deblocking a previous frame, processing proceeds to step 404 wherein the deblocking of the previous frame is completed. Processing then proceeds to step 406, wherein the status of the cores is updated. If the result of the test conducted in step 402 indicates that it is not necessary to finish deblocking a previous frame, processing proceeds to step 408 wherein a test is conducted to determine whether the respective slave core is able to deblock part of the current frame. If the test conducted in step 408 indicates that the respective slave core is able to deblock part of the current frame, processing proceeds to step 410, wherein the current frame is deblocked. If, however, the result of the test conducted in step 408 indicates that it is not possible to deblock part of the current frame, processing proceeds to step 412 wherein a test is conducted to determine if there is a free slice to be encoded. If the result of the test conducted in step 412 indicates that there is a slice to be encoded, processing proceeds to step 414 wherein the available slice is encoded. If, however, the test conducted in step 412 indicates that there is no slice available for encoding, processing proceeds to step 416 wherein the encoding task is split between cores, followed by step 406, wherein the status of the cores is updated in step 406.

Figure 5:
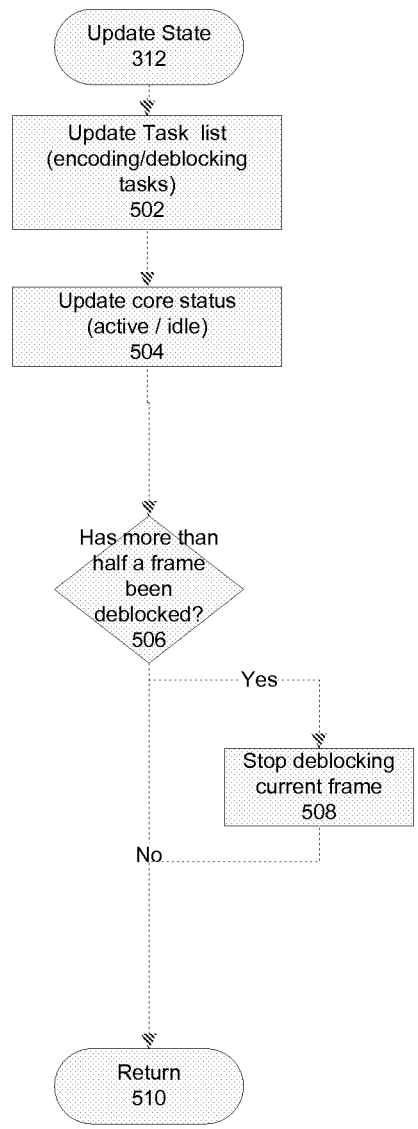
FIG. 5 is a flowchart illustration of a process flow for updating the state of processing cores in accordance with embodiments of the invention.

FIG. 5 is a flowchart illustration of a process flow or updating the state of processing cores in accordance with embodiments of the invention. In step 502, the update state is determined. In step 504, the core status is updated. In step 506, a test is conducted to determine whether more than half of a frame has been deblocked. If the result of the test conducted in step 506 indicates that more than half of a frame has been deblocked, processing proceeds to step 508 wherein deblocking of the current frame is terminated. If, however, the test conducted in step 506 indicates that less than half of a frame has been deblocked, processing proceeds to step 510, wherein processing proceeds as discussed hereinabove with regard to FIG. 3.

From the foregoing, it will be appreciated that embodiments of the invention provide a method for parallel processing of video signals. Embodiments of the method comprise the following steps: using a multi-core processor to establish a master-slave relationship between a first processing core and a plurality of individual processing cores; using a shared memory to store data and control messages; associating a plurality of individual private memories with each of the individual processing cores; and using control logic to establish a master-slave protocol for using the plurality of individual cores to process video data, wherein one of the individual processing cores is designated as a master and a predetermined number of other individual cores are designated as slave processors and wherein the master processing core is operable to balance the video data processing load among the individual slave processing cores. The individual slaves are operable to generate data processing progress reports and to send the data processing progress reports to the master processing core. In various embodiments, the master core is operable to partition a video data frame and is further operable to establish messaging queues between the master processing core and each of the slave cores. The master processing core is further operable to assign partition slices to predetermined individual slave processing cores and to assign an encoding or a deblocking processing request to the individual slave processing cores. In some embodiments the master processing unit is allocated its private memory and all shared memory, and the individual slave processing cores are allocated their respective individual private memories.

Other embodiments of the invention provide a system for parallel processing of video signals. The system is broadly comprised of: a multicore processor comprising a plurality of individual processing cores; a shared memory; a plurality of individual private memories associated with each of the individual processing cores; and control logic to operable to establish a master-slave protocol for using the plurality of individual cores to process video data, wherein one of the individual processing cores is designated as a master and a predetermined number of other individual cores are designated as slave processors and wherein the master processing core is operable to balance the video data processing load among the individual slave processing cores.

Although the described exemplary embodiments disclosed herein are directed to various examples of an improved system and method for providing load balancing between multiple cores used for parallel processing of video signals, the present invention is not necessarily limited to the example embodiments. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for parallel processing of video signal encoding operations, comprising:

using a multi-core processor, comprising a plurality of individual processing cores, to establish a master-slave processing protocol for encoding a video signal, wherein one of said individual processing cores is designated as a master processor core and a predetermined number of other individual processing cores are designated as slave processor cores;

using a shared memory to store video data frames and control messages for encoding the video data frames by said master processor core and said slave processor cores;

using said master processor core to control encoding of each video data frame by dynamically partitioning each video data frame into a plurality of partition slices and assigning each partition slice to a corresponding slave processor core for H.264 high-definition (HD) video encoding of said partition slice by sending a starting address and ending address for each partition slice assigned to each corresponding slave processor core to balance the video data processing load among said slave processor cores, wherein the master processor core is operable to send the starting address to each corresponding slave processor core when assigning each partition slice to said corresponding slave processor core, and is operable to send the ending address to each corresponding slave processor core after assigning each partition slice to said corresponding slave processor core.

2. The method of claim 1, wherein said master processor core is operable to establish messaging queues between said master processor core and each of said slave processor cores.

3. The method of claim 1, wherein said master processor core is operable to assign an encoding processing request to individual slave processor cores.

4. The method of claim 1, wherein said master processor core is operable to assign a deblocking processing request to an individual slave processor core by sending a deblock starting address and deblock ending address to the individual slave processor core.

5. The method of claim 1, wherein said slave processor cores are operable to update an executing task.

6. The method of claim 1, wherein said slave processor cores are operable to generate data processing progress reports and to send said data processing progress reports to said master processor core.

7. The method of claim 1, wherein the master processor core is operable to send the starting address and ending address to each corresponding slave processor core when assigning each partition slice to said corresponding slave processor core.

8. The method of claim 7, wherein the master processor core is operable to send an update ending address to each corresponding slave processor core after assigning each partition slice to said corresponding slave processor core.

9. A system for parallel processing of H.264 video signal encoding operations, comprising:
- a multi-core processor comprising a plurality of individual processing cores, wherein said multi-core processor is operable to establish a master-slave processing protocol for encoding a video signal, wherein one of said individual processing cores is designated as a master processor and a predetermined number of other individual processing cores are designated as slave processors; and
- a shared memory for storing video data frames and control messages for encoding the video data frames by said master processor and said slave processors in accordance with the H.264 high-definition (HD) video encoding standard;
- wherein said master processor dynamically partitions each video data frame into a plurality of partition slices and assigns each partition slice to a corresponding slave processor for H.264 high-definition (HD) video encoding by sending a starting address and ending address for each partition slice assigned to each corresponding slave processor to balance the video data processing load among said slave processors, and wherein said master processor is operable to send the starting address and ending address to each corresponding slave processor when assigning each partition slice to said corresponding slave processor, and is operable to send an update ending address to each corresponding slave processor after assigning each partition slice to said corresponding slave processor.

10. The system of claim 9, wherein said master processor is operable to establish messaging queues between said master processor and each of said slave processors.

11. The system of claim 9, wherein said master processor is operable to assign an encoding processing request to individual slave processors.

12. The system of claim 9, wherein said master processor is operable to assign a deblocking processing request to an individual slave processor by sending a deblock starting address and deblock ending address to the individual slave processor.

13. The system of claim 9, wherein said slave processors are operable to update an executing task.

14. The system of claim 9, wherein said slave processors are operable to generate data processing progress reports and to send said data processing progress reports to said master processor.

15. A method for parallel processing of H.264 video signal encoding operations, comprising:
- using a multi-core processor for encoding a video signal, the multi-core processor comprising a master processor and a plurality of slave processors;
- using a shared memory to store video data frames for encoding by said multi-core processor in accordance with the H.264 video encoding standard; and
- using said master processor to dynamically control parallel encoding of said video data frames by said slave processors, wherein said master processor is operable to dynamically partition each data frame, on an intra-frame basis, into a plurality of slices and is further operable to assign said slices to predetermined individual slave processors by sending a starting address and ending address for each partition slice assigned to each corresponding individual slave processor to balance the video data frame processing load among said individual slave processors, wherein the master processor is operable to send an update ending address to each corresponding slave processor after assigning each partition slice to said corresponding slave processor.

16. The method of claim 15, wherein said master processor is operable to assign an encoding processing request along with a corresponding starting address and ending address for each assigned slice to an individual slave processor.

17. The method of claim 15, wherein said master processor is operable to assign a deblocking processing request to an individual slave processor by sending a deblock starting address and deblock ending address to the individual slave processor.

18. The method of claim 15, wherein said slave processors are operable to generate data processing progress reports and to send said data processing progress reports to said master processor.

* * * * *